United States Patent
Hietmann (10) Patent No.: US 10,095,216 B2
(45) Date of Patent: Oct. 9, 2018

(54) SELECTION OF A DEVICE OR OBJECT USING A CAMERA

(71) Applicant: KUKA Roboter GmbH, Augsburg (DE)

(72) Inventor: Gerhard Hietmann, Herbertshofen (DE)

(73) Assignee: KUKA Roboter GmbH, Augsburg (DE)

( * ) Notice: Subject to any disclaimer, the term of this patent is extended or adjusted under 35 U.S.C. 154(b) by 46 days.

(21) Appl. No.: 15/162,056

(22) Filed: May 23, 2016

(65) Prior Publication Data

US 2016/0346936 A1   Dec. 1, 2016

(30) Foreign Application Priority Data

May 29, 2015  (DE) ........................ 10 2015 209 899

(51) Int. Cl.
*G05B 15/00*  (2006.01)
*G05B 19/00*  (2006.01)
*G05B 19/409*  (2006.01)

(52) U.S. Cl.
CPC .. *G05B 19/409* (2013.01); *G05B 2219/39444* (2013.01); *G05B 2219/39449* (2013.01);
(Continued)

(58) Field of Classification Search
CPC ............. G06F 3/011; G06F 1/1694; G06F 2203/04803; G06F 3/017; G06F 3/04815;
(Continued)

(56) References Cited

U.S. PATENT DOCUMENTS 5,594,469 A * 1/1997 Freeman ............... G05B 19/106
345/157
6,167,464 A * 12/2000 Kretschmann ....... G05B 19/042
340/539.1
(Continued)

FOREIGN PATENT DOCUMENTS

DE  102005061211  9/2006
DE  102012002657  8/2013
(Continued)

OTHER PUBLICATIONS

Hashimoto et al. "TouchMe: An Augmented Reality Based Remote Robot Manipulation" The 21st International Conference on Artificial Reality and Telexistence Nov. 28-30, 2011, Osaka, Japan ISSN: 1345-1278 C _ 2011 The Virtual Reality Society of Japan.*
(Continued)

*Primary Examiner* — Khoi H Tran
*Assistant Examiner* — Jorge O Peche (57) ABSTRACT

A method for actuating a manipulator system by means of a portable end device, a corresponding portable end device, and a robot system. The portable end device includes a 3-D camera that is a plenoptic camera. A three-dimensional image is acquired by means of the 3-D camera of the portable end device of at least part the manipulator system to be actuated. The image identifies at least one actuatable object in the manipulator system. A task is selected for the identified object to actuate. By selecting the identified actuatable object, the object is actuated to perform the task.

20 Claims, 4 Drawing Sheets

(52) U.S. Cl.
CPC ............ *Y10S 901/01* (2013.01); *Y10S 901/02* (2013.01); *Y10S 901/47* (2013.01)

(58) Field of Classification Search
CPC ......... G06F 3/0488; G06T 19/20; G06T 7/73; G05B 2219/23161; G05B 2219/35422; G05B 2219/35506; G05B 2219/36167; G05B 2219/39449; G09G 2340/125
See application file for complete search history.

(56) References Cited

U.S. PATENT DOCUMENTS

| | | | | |
|---|---|---|---|---|
| 6,292,713 | B1* | 9/2001 | Jouppi | G06F 3/011 345/629 |
| 7,298,385 | B2* | 11/2007 | Kazi | B25J 9/1671 345/633 |
| D678,378 | S* | 3/2013 | Selic | D15/199 |
| 8,625,018 | B2* | 1/2014 | Bilbrey | G06F 1/1694 348/333.01 |
| 8,660,690 | B2* | 2/2014 | Tani | B25J 9/1674 700/245 |
| 9,489,500 | B2* | 11/2016 | Takenaka | G06F 3/04883 |
| 9,625,571 | B1* | 4/2017 | Yamazaki | G01S 7/495 |
| 2002/0045970 | A1* | 4/2002 | Krause | B25J 9/1656 700/264 |
| 2002/0193908 | A1* | 12/2002 | Parker | G06N 3/008 700/258 |
| 2004/0015079 | A1* | 1/2004 | Berger | A61B 8/546 600/437 |
| 2007/0061041 | A1* | 3/2007 | Zweig | G05D 1/0261 700/245 |
| 2009/0105880 | A1* | 4/2009 | Okazaki | B25J 9/1633 700/258 |
| 2010/0106299 | A1* | 4/2010 | Nagata | B25J 13/06 700/264 |
| 2010/0152899 | A1* | 6/2010 | Chang | B25J 9/162 700/262 |
| 2011/0170745 | A1* | 7/2011 | Chen | G06F 3/017 382/103 |
| 2011/0216060 | A1* | 9/2011 | Weising | G09G 5/08 345/419 |
| 2014/0018957 | A1* | 1/2014 | Matsumoto | B25J 9/1697 700/251 |
| 2014/0082676 | A1* | 3/2014 | Barowski | B60K 37/06 725/75 |
| 2014/0347352 | A1* | 11/2014 | Lumsdaine | H04N 13/122 345/419 |
| 2015/0042621 | A1* | 2/2015 | Grzesiak | G06F 3/011 345/175 |
| 2015/0273689 | A1* | 10/2015 | Ouchi | B25J 9/161 700/257 |
| 2015/0273692 | A1* | 10/2015 | Ogawara | B25J 9/1692 700/253 |
| 2016/0052133 | A1* | 2/2016 | Kim | A47L 9/2805 700/257 |
| 2016/0059413 | A1* | 3/2016 | Ogata | B25J 9/163 700/186 |
| 2016/0059419 | A1* | 3/2016 | Suzuki | B25J 9/1697 700/114 |
| 2016/0266655 | A1* | 9/2016 | Heyl | G06F 3/017 |
| 2016/0303739 | A1* | 10/2016 | Apkarian | B25J 3/04 |
| 2017/0123820 | A1* | 5/2017 | Nishi | B25J 9/1656 |
| 2017/0144297 | A1* | 5/2017 | Takaichi | B25J 13/06 |
| 2017/0147080 | A1* | 5/2017 | Watanabe | B60K 35/00 |
| 2017/0291806 | A1* | 10/2017 | Lessing | B25J 15/0023 |
| 2018/0001477 | A1* | 1/2018 | Greer | B25J 9/1692 |

FOREIGN PATENT DOCUMENTS

| | | |
|---|---|---|
| EP | 1716983 | 5/2008 |
| FR | 2990286 | 11/2013 |
| KR | 101456172 B1 | 10/2014 |
| KR | 20150028152 A | 3/2015 |
| WO | 2015/055668 | 4/2015 |

OTHER PUBLICATIONS

Shepherd: An Interface for Overcoming Reference Frame Transformations in Robot Control Kazuhiro Hosoi; Masanori Sugimoto 2006 IEEE International Conference on Robotics and Biomimetics Year: 2006, pp. 908-913.*

The extended European Search Report, dated Oct. 13, 2016, in the related European Patent Appl. No. 16171300.3.

Kazuhior Hosoi et al: "Shepherd: An Interface for Overcoming Reference Frame Transformations in Robot Control" Robotics and Biomimetics, 2006, Dec. 1, 2006, pp. 908-913.

Sunao Hashimoto et al., "TouchMe: An Augmented Reality Based Remote Robot Manipulation" Jan. 1, 2011, pp. 1-6.

Designinterface: "TouchMe: An Augmented Reality Based Remote Robot Manipulation," YouTube, Dec. 5, 2011 (Dec. 5, 2011), pp. 1-1, XP054976818, retrieved from the Internet: URL:https://www.youtube.com/watch?v=l_tmHLeKTkg [retrieved on Oct. 6, 2016].

The English translation of the Korean Office Action, dated Mar. 1, 2017, in the related Korean Patent Appl. No. 10-2016-0061560.

Examination Report from GPTO in DE Appl. No. 10 2015 209 899.0, dated Oct. 19, 2015.

* cited by examiner

SELECTION OF A DEVICE OR OBJECT USING A CAMERA

This application claims the benefit of priority 35 § 119(a) to German Patent Application No. 10 2015 209 899.0, filed on May 29, 2015.

1 TECHNICAL FIELD

The present invention relates to a method for selecting and actuating a manipulator system by means of a portable end device and also to a corresponding portable end device and a manipulator system.

2 TECHNICAL BACKGROUND

A manipulator, and especially an industrial robot, is a freely programmable, program actuated handling device. Such a manipulator may comprise a plurality of movable, mutually linked members or axes that define a kinematic chain.

To be able to use a manipulator, the latter must normally be set in operation and programmed. During the start-up phase, the requirements for subsequent programming of a manipulator program are produced. Thus, inter alia, during a start-up, for instance a manipulator is adjusted, an end effector or tool (such as, for instance, a gripper) of the manipulator is parameterized, one or a plurality of laser scanners for a mobile platform are calibrated, working or blocked areas of a manipulator are defined, robot-guided or stationary cameras are parameterized, or coordinate systems, such as, for instance, a base coordinate system, are even defined.

During the creation of a manipulator program, various instructions for using devices and/or objects may be produced and arranged in a desired sequence. For instance, it is possible to define that a manipulator is moved in a certain manner between a start point and a target point, a mobile platform is to move along a certain track, an end effector is to execute a desired action, or images are to be recorded using a camera, etc.

The start-up or programming of a manipulator is frequently performed on-site using a portable operating control device. For structuring the tasks to be executed and/or actuatable objects of the manipulator, the operator interface of the operating control device generally has a tree or menu structure. This structure may be designed in different ways, and may be organized, for example, oriented by function or object or device. However, the use of such a tree structure is generally confusing, because normally a large number of devices, objects, and/or tasks must be reflected or provided. A search for the correct menu item for a specific task that the user wants to execute is therefore often tedious: the user or operator must laboriously navigate the tree structure until he finds an appropriate element.

It is therefore an object of the present invention to provide a method with which it is possible to select a manipulator control task simply and intuitively. It is in particular an object of the present invention to provide a method with which a manipulator or robot may be actuated directly without great complexity. It is furthermore an object of the present invention to provide an operating control device and a manipulator system with which a manipulator may be actuated, wherein at least some of the aforesaid disadvantages may be eliminated.

The subject-matter of the main claim and of the coordinate claims attain these and other objects that will become apparent when reading the following description.

3 CONTENT OF THE INVENTION

One aspect of the present invention includes a method for actuating a manipulator system by means of a portable end device. The manipulator system may include a plurality of manipulators or robots, for instance an articulated arm robot installed on an autonomous driverless transport vehicle. The portable end device may itself be a robot operating control device, or even a mobile consumer device (such as, for instance, a tablet PC, a smartphone, a smartwatch, or the like.) In any case, the portable end device preferably includes a camera that permits images to be acquired. The camera is preferably in particular a 3-D camera that permits three-dimensional images to be acquired.

The inventive method includes acquiring an image, by means of the camera in the portable end device, of at least some of the manipulator system to be actuated. For instance, a robot arm of the manipulator system may be detected, or, for instance, a gripper that is to be actuated. Preferably an image is acquired of each part of the manipulator system that is to be actuated.

The method furthermore includes determining a feature of the manipulator system based on the acquired image. The features, or even feature, of the manipulator system is characteristic of the manipulator system so that it may be classified (identified) using the determined features.

The method furthermore includes identifying at least one actuatable object of the manipulator system based on the determined feature, and actuating the manipulator system. Thus an object that may be actuated (such as, e.g., a gripper in the manipulator) is identified using the determined feature.

Thus the inventive method permits the necessary device or necessary object of a manipulator system to be selected and actuated intuitively, for instance in any phase of the generation of an application task, in order for instance to execute parameterization, action, diagnosis, or the like for this object. It is not necessary to search laboriously through menu trees and/or instruction lists. An operator of the portable end device must merely acquire an image by means of the camera, whereupon one or a plurality of actuatable objects of the manipulator system are automatically identified. The user may preferably stand in any position or orientation relative to the manipulator system, and may obtain context-related or even context-unrelated functions or information for a manipulator or an object or device of the manipulator system at any time, for instance, by activating the camera.

The camera is preferably a 3-D camera, and the image acquired by means of this 3-D camera is a three-dimensional image. The use of a 3-D camera has the advantage, inter alia, that the operator of the portable end device may also be disposed at a greater (and thus safer) distance from the manipulator system to be actuated. Advantageously, only one image must be taken, since the resulting three-dimensional image contains enough information for executing the inventive method.

Furthermore, the inventive method preferably includes provision of reference data sets for the manipulator system to be actuated. In particular, this provision of reference data sets may preferably include teaching at least the actuatable object of the manipulator system by means of the portable end device. For instance, a user in a teach mode may teach one or all devices and objects of a manipulator system. For instance, each device or object is imaged by means of the 3-D camera from a number of directions, and each device or object is defined using the images. These reference data sets are later used for identifying the manipulator system to be actuated or objects of the system.

Determining the feature of the manipulator system furthermore preferably includes performing an image recognition process that detects the feature based on the acquired three-dimensional image and the preferably provided reference data sets. Thus, for instance, by comparing the three-dimensional image to the provided reference data set, a feature is detected that is also included in the three-dimensional image. This feature may be a part of a gripper, for instance, that is characteristic for this gripper. Thus it is possible to control the manipulator system without a great deal of operator involvement.

The portable end device preferably includes a rendering device that itself preferably includes a touch panel. This touch panel (or touch screen, touch display, or touch-sensitive screen) is a combined input and output device with which an operator can interact by touching parts of the panel or screen. The method furthermore preferably includes rendering the acquired three-dimensional image on the rendering device of the portable end device. Thus an operator of the portable end device can immediately see the image of the at least one part of the manipulator system to be actuated and advantageously determine whether an appropriate image was acquired, that is, whether, for instance, the object that is to be actuated is the object of the manipulator system that was imaged.

The method furthermore preferably includes rendering of an optical marking on the rendering device of the portal end device, which optical marking specifies the identified object of the manipulator system. Thus the object identified or detected is directly visualized on the rendering device. Consequently, an operator is provided a direct response or feedback in a simple and intuitive manner.

Actuating the manipulator system furthermore preferably includes an operator of the portable end device selecting the identified object of the manipulator system. The operator thus actively selects, by means of the portable end device, the identified object that is preferably to be actuated. To this end, for instance, an operator may tap an object (such as, for example, a gripper) on a touch panel, which object was preferably identified, and furthermore is preferably marked and specified with an appropriate optical marking on the rendering device, that is, the touch panel. Then the gripper, for instance, may open or close in reaction to the tap. The selection of the identified object in the manipulator system therefore preferably includes selecting the optical marking on the rendering device of the portable end device. The operator may thus directly recognize which objects in the rendered image may be selected and actuated.

Preferably at least two objects in the manipulator system are identified, and at least two optical markings are rendered on the rendering device of the portable end device, wherein each optical marking specifies one of the identified objects from the manipulator system. Consequently, the manipulator system has at least two actuatable objects and an operator can intuitively directly recognize which objects he can select and actuate, wherein laboriously searching through menu trees and the like is advantageously not needed.

The actuating of the manipulator system preferably actuates the identified object of the manipulator system. Thus it is advantageously precisely the object that was identified that is actuated. For instance, an operator can orient the portable end device such that a three-dimensional image of an object, such as for example a gripper, is acquired and the gripper is identified and directly actuated so that the gripper is closed if it was open, for instance, or vice versa. In this manner it is thus possible to realize a very intuitive and efficient use of the manipulator system for specific tasks without having to laboriously navigate menu trees or instruction trees. If more than one actuatable object was identified, preferably that object that is closest to the center of the image of the three-dimensional image that was acquired is actuated directly. Thus, by appropriately orienting the 3-D camera, an operator can influence which object in the manipulator system is to be actuated by means of the inventive method.

The activation of the manipulator system preferably includes querying, providing, creating, and/or modifying data of the manipulator system, wherein these data preferably describe at least one of the following: adjusting and/or orienting a manipulator system, parameterizing an end effector, calibrating the manipulator and/or the end effector, defining a work area, parameterizing the object of the manipulator system, defining a coordinate system or a program sequence. The coordinate system may be, for example, a base, robot, tool, or flange coordinate system, wherein this list is not exhaustive. Consequently, it is possible to perform a start-up of a manipulator intuitively by means of the inventive method. The program sequence may be prepared by means of the method, especially with programming of a manipulator. Such a program sequence may describe individual trajectory points and movements therebetween. The programmer can simply and intuitively program a manipulator by means of the method by creating and/or modifying data that describe a program sequence, for instance. The person skilled in the art understands that the actuation of the manipulator system may occur indirectly in that the programmer performs programming of the manipulator offline, for instance, and the manipulator is moved at a later point in time using the prepared program sequence.

Actuating the manipulator system preferably includes creating, modifying, and/or executing a function or a program, so that preferably at least one of the following is executed: action of an end effector (such as for instance opening or closing a gripper), moving the object of the manipulator system, controlling the object of the manipulator system, moving a manipulator, controlling the manipulator, or changing a program sequence. Thus, it is possible, for instance, to program a manipulator simply and intuitively.

The method furthermore preferably includes rendering of context-dependent data, taking into account the determined feature, by means of the rendering device. Furthermore, the rendering of context-dependent data preferably occurs taking operator input into consideration. Thus the rendering on the rendering device may depend, for instance, on whether a start-up mode or programming mode is selected. In the start-up mode, if a gripper is selected, geometric dimensions of a gripper, weights, centers of gravity, inertia values, volume models, allocations of inputs/outputs, etc. may be rendered, for instance. Selecting a laser scanner, for instance, can cause a menu for calibrating this laser to be displayed. In contrast, in the programming mode, if the gripper is selected, actions that can be performed by a gripper may be depicted to the programmer (such as, for instance, opening/closing gripper). By selecting a robot arm in the programming mode, possible actions that the robot arm can execute (such as, for instance, a linear movement)

may be displayed. This context-dependent information provides additional support to the operator and permits him to work intuitively.

The 3-D camera is preferably a plenoptic camera that is based on the principle of light field sensors. Such light field sensors comprise a field of microlenses and retain the light and color of the photographed object. Furthermore, the direction from which the light beams strike is also determined. Thus, using the light field sensors it is possible, inter alia, to modify the focus of the image retroactively, and 3-D models of imaged objects may be created. The acquisition of the three-dimensional image preferably includes a four-dimensional light field, by means of the plenoptic camera, of the at least one part of the manipulator system to be actuated. Thus a feature of the manipulator system may be determined with great accuracy based on the acquired image.

Another aspect of the present invention relates to a portable end device including a camera and a device control unit, wherein the device control unit is set up to guide an inventive method for actuating a manipulator system. The portable end device may advantageously be small in size, since a complex display of tree structures is not necessary. The camera is preferably a 3-D camera.

Another aspect of the present invention relates to a manipulator system comprising a manipulator and a portable end device that includes a camera, wherein the manipulator system furthermore has a manipulator control unit that is set up to conduct an inventive method for actuating the manipulator system. The camera is preferably a 3-D camera. The camera for the portable end device is especially preferably a plenoptic camera.

4 EXEMPLARY EMBODIMENTS

The present invention shall be described in detail in the following, using the attached drawings.

Figure 1:
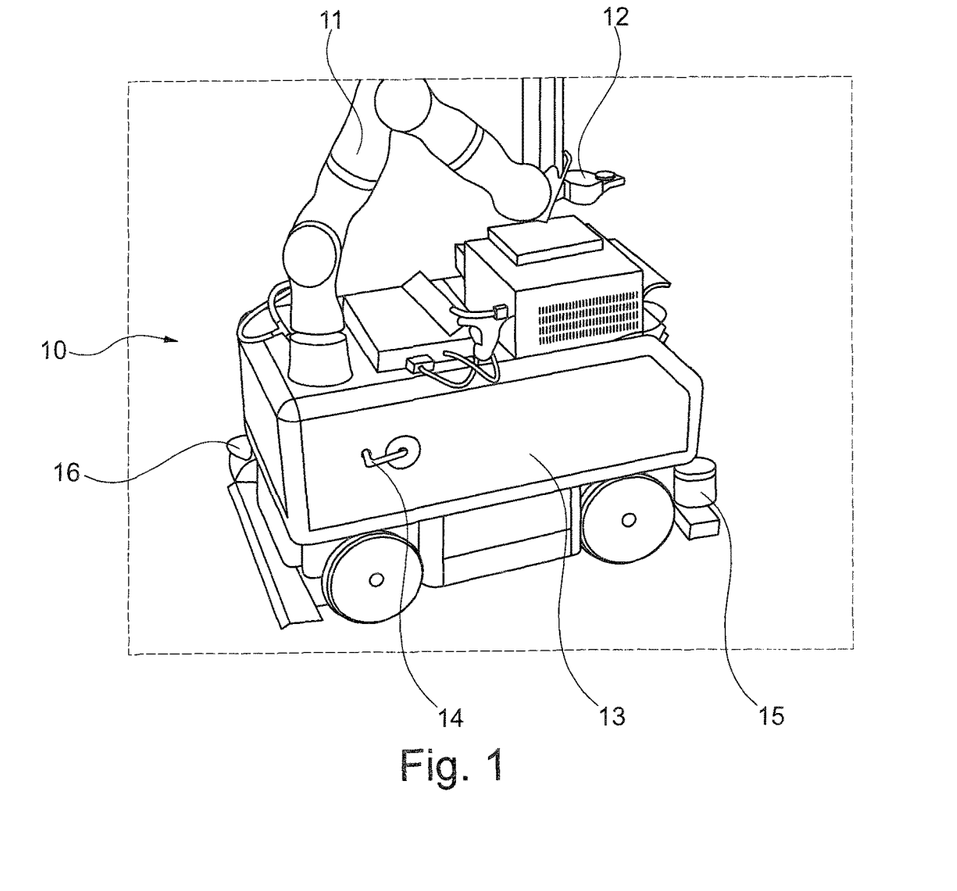
FIG. 1 depicts an example of a manipulator system.

FIG. 1 depicts an exemplary manipulator system to that constitutes, inter alia, an articulated arm robot 11 and an autonomous transport vehicle 13. The manipulator system 10 includes a plurality of actuatable objects, such as, for example, the articulated arm robot 11 itself, a gripper 12 of the articulated arm robot 11, the autonomous transport vehicle 13 itself, and various sensors 14, 15, 16 that may include laser scanners, for instance. To actuate the manipulator system 10 in the context of the present invention, an operator of a portable end device that includes a 3-D camera records an image by means of the 3-D camera.

Figure 2:
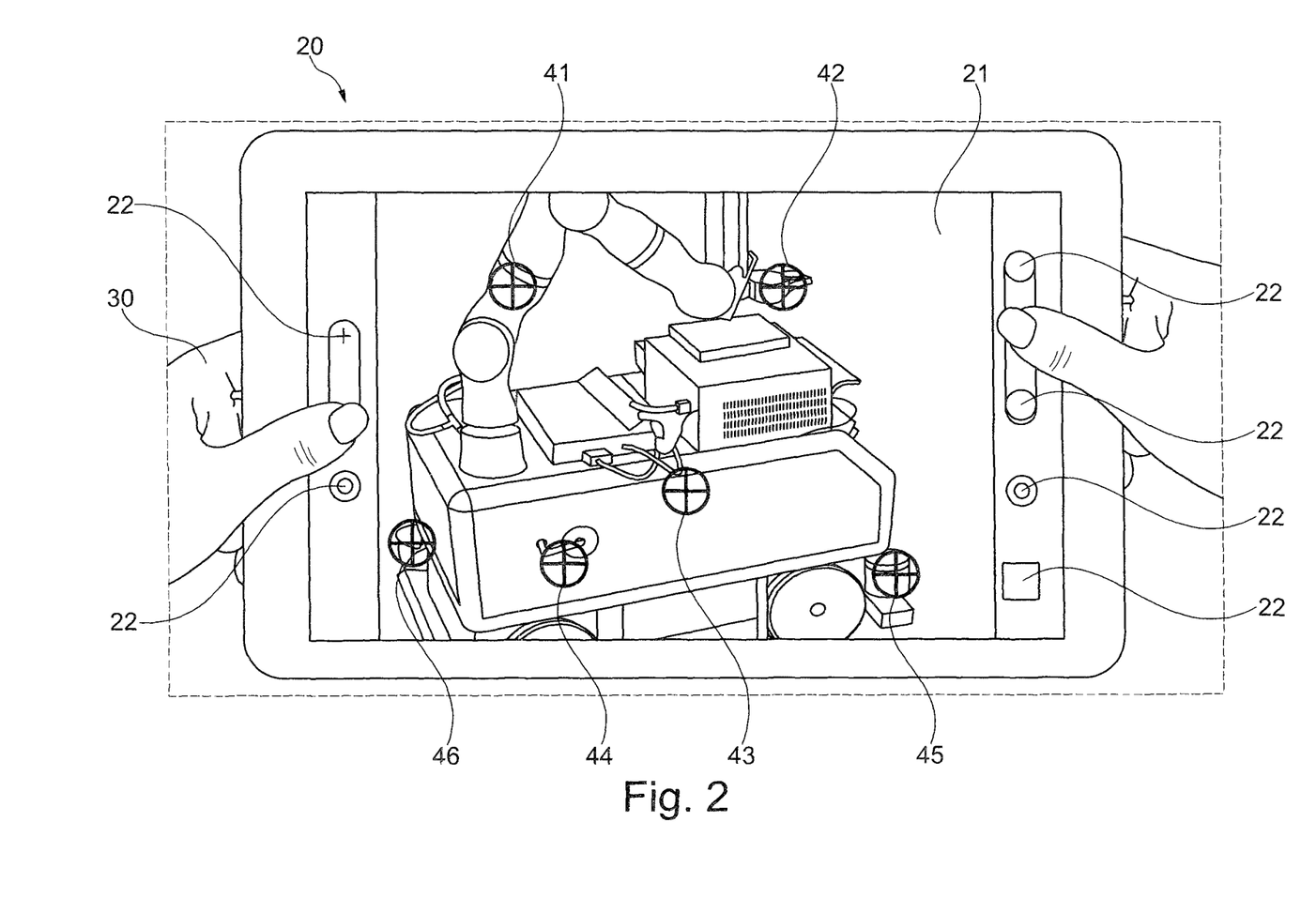
FIGS. 2 and 3 depict exemplary views of a portable end device.
Figure 3:
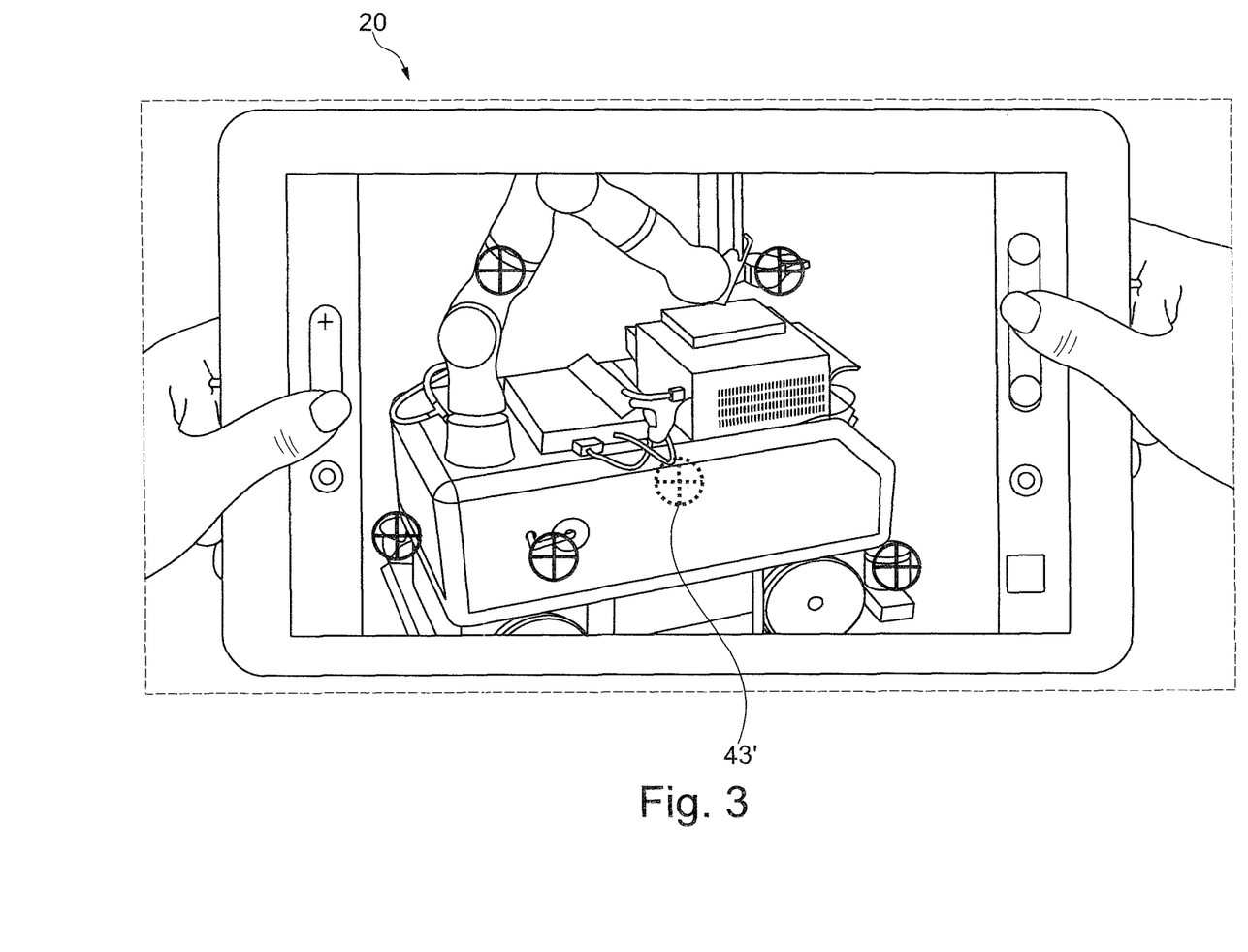

FIG. 2 depicts an example of such a portable end device 20, which has a touch display 21 and is operated by an operator 30. An image of the manipulator system 10 from FIG. 1, acquired by means of the portable end device 20, is depicted on the touch display 21. In the context of the present invention, a plurality of actuatable objects of the manipulator system 10 were identified and marked or specified on the touch display using corresponding markings 41, 42, 43, 44, 45, 46. For instance, to select one of the identified objects, the operator 30 may tap the desired marking of the object on the touch display that is to be actuated in order to select it intuitively and actuate it. As indicated in FIG. 3 with reference number 43', the selected actuatable object may be marked with a special marking, and its color may differ e.g. from the other markings. For instance, the autonomous transport vehicle 13 was selected and is now marked with a marking 43' that is different in color from the other markings. Alternatively, the object that is closest to the center of the image may also be selected automatically.

The portable end device 20 has a 3-D camera (not shown), as well as various keys 22 that may be used for controlling the portable end device, e.g. for zooming, activating the camera function, or for controlling various processes, such as for instance individual processes of the inventive method for actuating a manipulator system.

Figure 4:
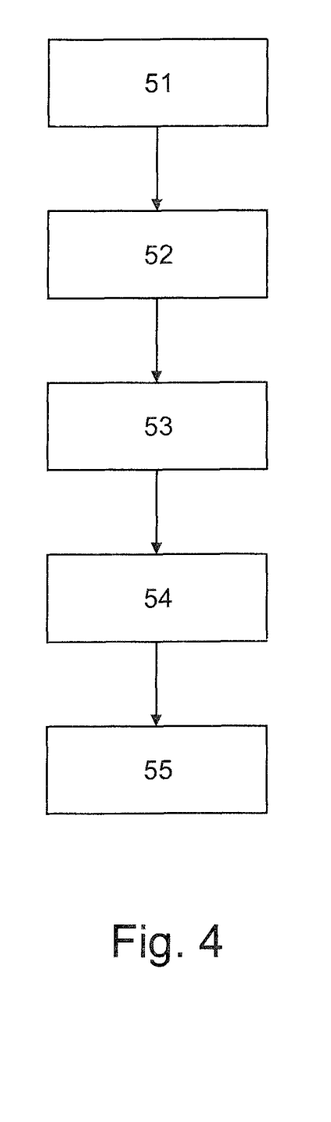
FIG. 4 is a schematic depiction of an exemplary sequence of an inventive method for controlling a manipulator system.

FIG. 4 depicts an exemplary sequence of an inventive method for actuating a manipulator system. This method is described in the following with reference to the components depicted in the other figures, but is not limited to this.

The method begins in step 51, in which devices or objects of an application cell are taught. To this end, the devices or objects (for instance, actuatable components of the manipulator system 10) are recorded from a plurality of directions by means of the 3-D camera of a portable end device 20, and the devices or objects are taught using these recordings. In step 52 a user can additionally define sub-objects for these learned objects. For instance, if a robot arm was taught as an actuatable object, the individual joints in the robot arm may be defined as sub-objects. Likewise, for instance, left or right gripping jaws of a gripper may be defined as sub-objects of the gripper. In step 53, specific actions or tasks may be assigned to the taught objects or even the defined sub-objects.

In step 54 it is determined that an action or task is to be selected or performed for a desired object. In the present example, the autonomous transport vehicle 13 is to be actuated. To this end, the operator 30 presses a corresponding key 22 of the portable end device 20 to activate the camera function of the 3-D camera. The viewfinder of the camera is pointed toward a part of the manipulator system to that shows or contains the object to be actuated. The rendering part or touch display 21 of the end device 20 displays the selected image segment.

In step 55, at least one feature of the manipulator system 10 is determined based on the acquired three-dimensional image, and all actuatable objects of the manipulator system that are included in the acquired image are identified and appropriately marked on the touch display, e.g. using blue symbols. The operator 30 selects the desired object to be actuated, and it is actuated. To this end, for instance, after selection by tapping of the touch display 21, a list of possible actions, including for instance the "rotate the object" action, may be displayed on the touch display 21. Selecting such an action using an appropriate control actuates the selected autonomous transport vehicle 13 such that it rotates.

It should be noted that the invention claimed herein is not limited to the described embodiments, but may be otherwise variously embodied within the scope of the claims listed infra.

LIST OF REFERENCE SYMBOLS

10 Manipulator system
11 Articulated arm robot
12 Gripper
13 Autonomous transport vehicle
14, 15, 16 Sensors
20 Portable end device
21 Touch display (touch panel)
22 Keys
30 Operator
41, 42, 43, 43', 44, 45, 46 Markings

The invention claimed is:

1. A method for actuating objects in a manipulator system by means of a portable end device, wherein the portable end device includes a camera, a device control unit and a rendering device, wherein the device control unit performs the steps of:
   acquiring an image, by means of the camera in the portable end device, imaging at least a portion of the manipulator system;
   obtaining access to reference data sets for at least the manipulator system wherein reference data sets include camera image data of at least the portion of the manipulator system;
   identifying at least one feature of the manipulator system by performing an image recognition process using the camera image and the reference data sets, wherein the at least one feature comprises a visible aspect of the manipulator system that is apparent in the acquired camera image and characteristic of the manipulator system or an actuatable object of the manipulator system;
   classifying the imaged manipulator system based on the at least one characteristic feature;
   displaying the acquired camera image of the manipulator system on the rendering device of the portable end device;
   identifying the at least one actuatable object of the manipulator system based on the at least one characteristic feature and the reference data sets for the identified manipulator system;
   rendering an optical marking the camera image diplayed on the rendering device of the portable end device, the optical marking indicating the at least :one actuatable object of the manipulator system; and
   actuating the actuatable object of the manipulator system upon receiving an input via a user interface of the portable end device to select the optical marking.

2. The method in accordance with claim 1, wherein the camera is a 3-D camera and the acquired image is a three-dimensional image.

3. The method in accordance with claim 2, wherein the image includes 3-D image data and the feature comprises at least a portion of a physical component of the manipulator that is visible in the 3-D image.

4. The method in accordance with claim 3, wherein the physical component is a gripper.

5. The method in accordance with claim 1, wherein the reference data sets for the manipulator identify and include camera image data of the at least one actuatable object.

6. The method in accordance with claim 1, wherein the rendering device includes a touch panel.

7. The method in accordance with claim 6, further including the step of rendering of context-dependent data, taking into account the determined feature, based on operator input.

8. The method in accordance with claim 7, wherein the operator assistance comprises a selection of one of a start-up mode or a programming mode of the portable end device.

9. The method in accordance with claim 1, wherein:
   at least two actuatable objects of the manipulator system are identified and at least two optical markings are rendered on the camera image displayed on rendering device of the portable end device,
   each optical marking specifies one of the identified objects of the manipulator system, and
   wherein the actuating step comprises the step of selecting at least one of the optical markings specifying one of the identified objects rendered on the rendering device.

10. The method in accordance with claim 1, wherein the step of actuating the actuatable object of the manipulator system includes a step of querying, providing, creating, or modifying data of the manipulator system, which data describe at least one of the following:
    adjusting or orienting a manipulator;
    parameterizing an end effector;
    calibrating the manipulator and/or the end effector;
    defining a work area;
    parameterizing the object of the manipulator system;
    defining a coordinate system; or
    a program sequence.

11. The method in accordance with claim 1, wherein the step of actuating the actuatable object of the manipulator system includes a step of creating, modifying, or and/or executing a function or a program directed to at least one of the following:
    action of an end effector;
    moving the object of the manipulator system;
    controlling the object of the manipulator system;
    moving a manipulator;
    controlling the manipulators; or
    changing a program sequence.

12. The method in accordance with claim 1, wherein the camera is a plenoptic camera, and wherein the acquisition of the image includes acquisition of a four-dimensional light field, by means of the plenoptic camera, of the at least one object of the manipulator system to he actuated.

13. A portable end device including a camera, a rendering device and a device control unit, wherein the device control unit is configured to:
    acquire an image, by means of the camera in the portable end device, of at least a portion of a manipulator system;
    obtain access to reference data sets for the manipulator system, wherein the reference data sets include camera image data of at least the portion of the manipulator system;
    determine a feature of the manipulator system by performing an image recognition process using the camera image and the reference data sets, wherein the at least one feature comprises a visible aspect of the manipulator system that is apparent in the acquired camera image and characteristic of the manipulator system or an actuatable object of the manipulator system;
    classifying the imaged manipulator system based on the at least one characteristic feature;
    display the acquired camera image of the manipulator system on the rendering device of the portable end device;
    identify the at least one actuatable object of the manipulator system based on the at least one characteristic feature and the reference data sets for the manipulator system;
    render an optical marking on the camera image diplayed on the rendering device of the portable end device, the optical marking indicating the at least one actuatable object of the manipulator system; and
    actuate the actuatable object of the manipulator system upon receiving an input via a user interface of the portable end device to select the optical marking.

14. The portable end device in accordance with claim 13, wherein the camera is a 3-D camera.

15. The portable end device in accordance with claim 14, wherein the camera is a plenoptic camera.

16. The portable end device in accordance with claim 14, wherein the image includes 3-D image data and the feature comprises at least a portion of a physical component of the manipulator that is visible in the 3-D image.

17. A manipulator system, including a manipulator and a portable end device that includes a camera and a rendering device, wherein the manipulator system furthermore has a manipulator control unit that is configured to:
   acquire an image, by means of the camera in the portable end device, of at least a portion of the manipulator system;
   obtain access to reference data sets for the manipulator system, wherein the reference data sets include camera image data of at least the portion of the manipulator system;
   identify at least one feature of the manipulator system by performing an image recognition process using the camera image and the reference data sets, wherein the at least one feature comprises a visible aspect of the manipulator system that is apparent in the acquired camera image and characteristic of the manipulator system or an actuatable object of the manipulator system;
   classifying the imaged manipulator system based on the at least one characteristic feature;
   display the acquired camera image of the manipulator system on the rendering device of the portable end device;
   identify the at least one actuatable object of the manipulator system based on the at least one characteristic feature and the reference data sets for the manipulator system;
   render an optical marking on the camera image diplayed on the rendering device of the portable end device, the optical marking indicating the at least one actuatable object of the manipulator system; and
   actuate the actuatable object of the manipulator system upon receiving an input via a user interface of the portable end device to select the optical marking.

18. The manipulator system in accordance with claim 17, wherein the camera is a 3-D camera.

19. The manipulator system in accordance with claim 18, wherein the camera is a plenoptic camera.

20. The manipulator system in accordance with claim 18, wherein the image includes 3-D image data and the feature comprises at least a portion of a physical component of the manipulator that is visible in the 3-D image.

* * * * *